J. J. FRAWLEY.
QUICK STEERING MECHANISM FOR AGRICULTURAL AND OTHER WHEELED MACHINES.
APPLICATION FILED MAY 17, 1920.

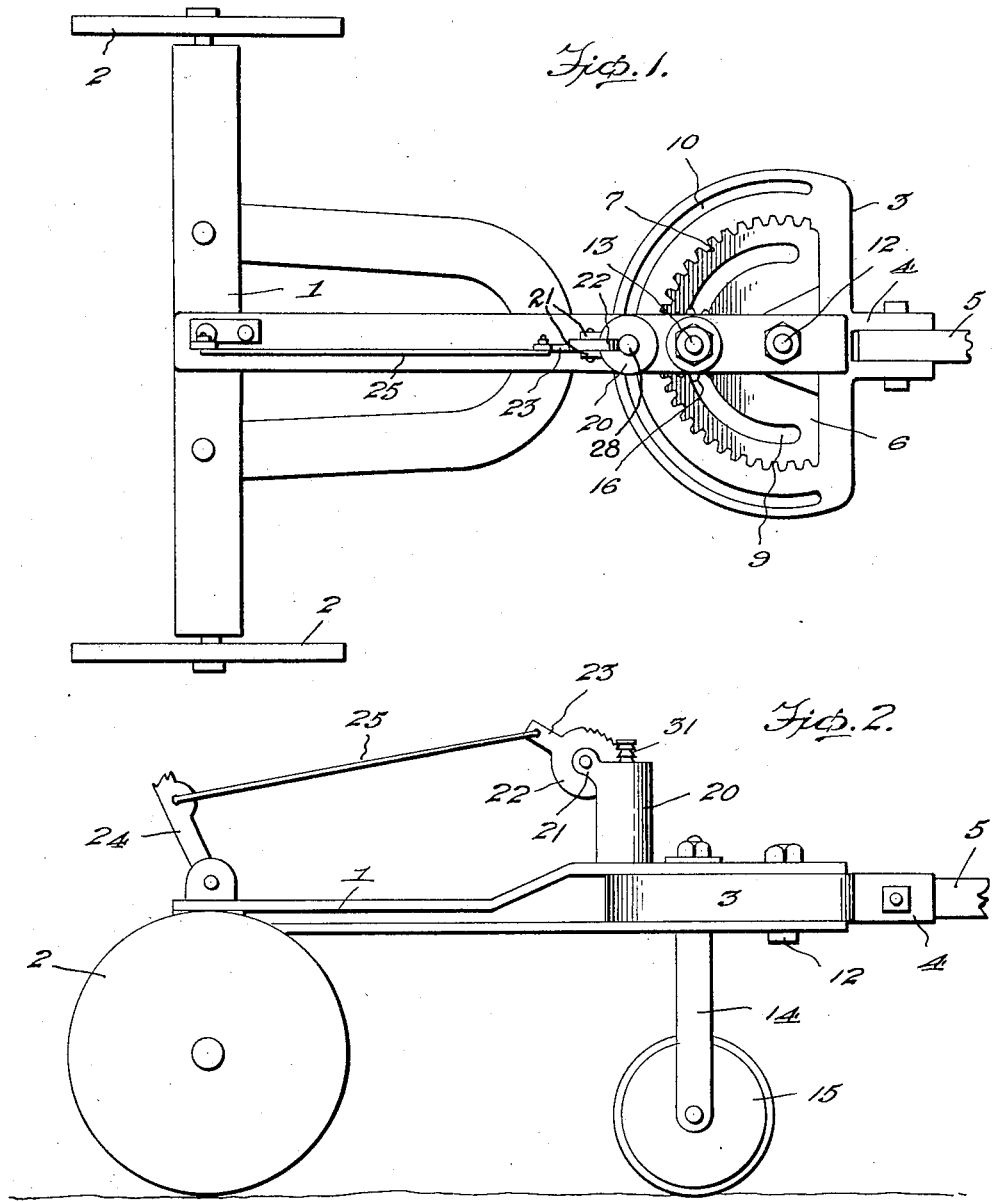

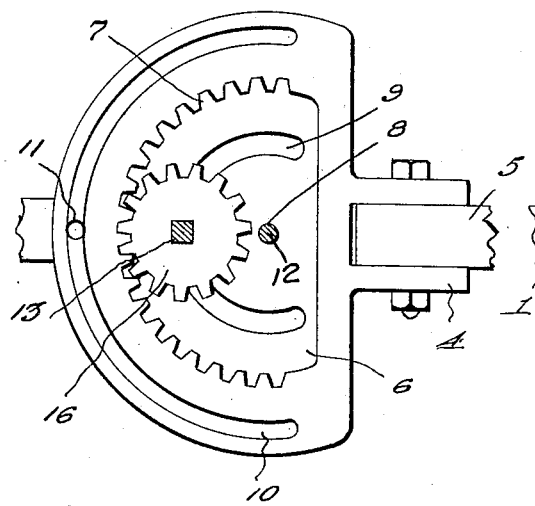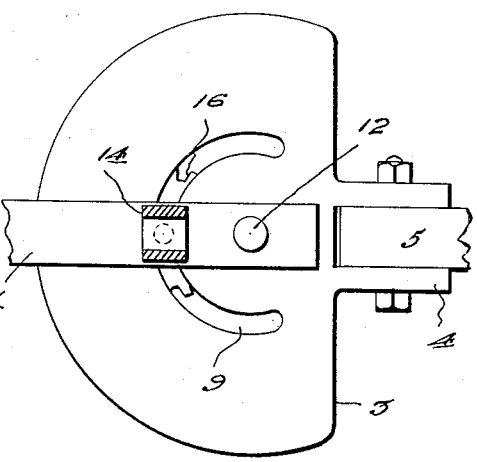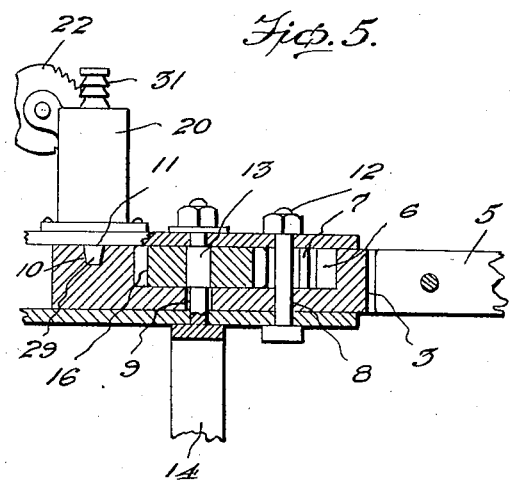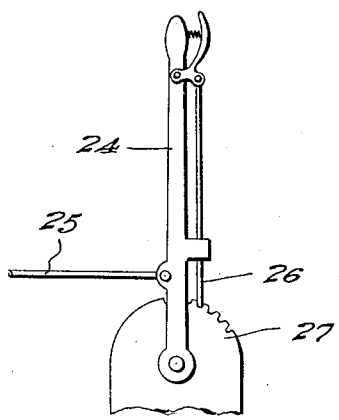

1,386,562.

Patented Aug. 2, 1921.

J. J. Frawley
INVENTOR

BY Victor J. Evans
ATTORNEY

WITNESS

UNITED STATES PATENT OFFICE.

JOHN J. FRAWLEY, OF STILLWATER, MINNESOTA.

QUICK-STEERING MECHANISM FOR AGRICULTURAL AND OTHER WHEELED MACHINES.

1,386,562. Specification of Letters Patent. Patented Aug. 2, 1921.

Application filed May 17, 1920. Serial No. 381,973.

*To all whom it may concern:*

Be it known that I, JOHN J. FRAWLEY, a citizen of the United States, residing at Stillwater, in the county of Washington and State of Minnesota, have invented new and useful Improvements in Quick - Steering Mechanism for Agricultural and other Wheeled Machines, of which the following is a specification.

The object of my present invention is the provision of steering mechanism constructed with a view to facilitating turning and reversing of any wheeled machine, such for instance as a harvester, mower or binder.

To the attainment of the foregoing, the invention consists in the improvement as hereinafter described and definitely claimed.

In the accompanying drawings, hereby made a part hereof:

Figure 1 is a top plan view illustrating the application of my improvement.

Fig. 2 is a side elevation of the same.

Fig. 3 is a detail plan view of a portion of the mechanism.

Fig. 4 is an inverted plan view of the same.

Fig. 5 is an enlarged detail view, partly in side elevation and partly in vertical section, showing a portion of the mechanism.

Fig. 6 is a detail view of the controlling lever complementary to the locking means.

Similar numerals of reference designate corresponding parts in all of the views of the drawings.

Figure 7:
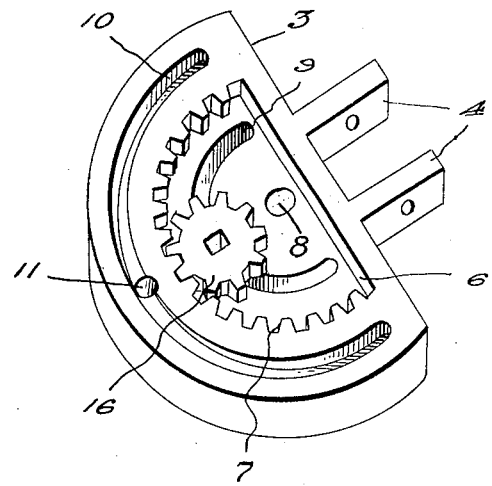
Fig. 7 is a view in perspective of the grooved, slotted and toothed casting of the construction.
Figure 9:
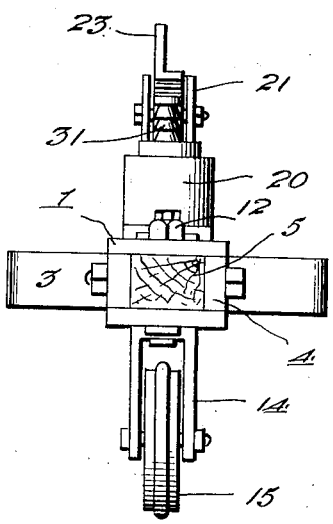
Figs. 8 and 9 are views showing the locking means of the construction.
Figure 8:
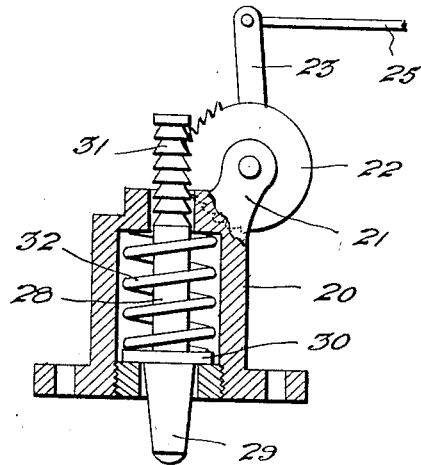

At 1 in Figs. 1 and 2 is a frame, supported by ground wheels 2, and at 3 is a horizontally disposed member, preferably in the form of a casting and fixedly connected with the frame 1 in the manner shown or in any other approved manner compatible with the purpose of my invention. The said member 3 is provided at 4 with parallel and apertured lugs between which is arranged and connected a steering pole 5. The said member 3 is also characterized by a recess 6 in its upper side, one wall of which is formed by an arcuate rack 7. Formed in the bottom wall of the said recess 6 is a vertically disposed aperture 8 and an arcuate slot 9, while formed in the upper side of the member 3 is an arcuate groove 10 that is in communication with a central downwardly tapered aperture or bore 11. The aperture 8 is for the reception of a pivot pin 12. Movable in the arcuate slot 9 of member 3 is a vertical shaft 13, the lower portion of which is forked, as indicated by 14, for the reception of a main front steering wheel 15. A portion of the said shaft 13 is of angular form in cross-section, and fixed on the same and disposed and movable in the before-mentioned recess 6 is a spur gear 16, having by preference as many teeth as and intermeshed with the arcuate rack 7, so as to make said gear 16 turn two to one.

Superimposed on and fixed to the connection between the member 3 and the frame 1 is the housing 20 of the locking means comprised in my improvement. The said housing is provided with standards 21, and between said standards is mounted a gear 22 that is equipped with an upstanding arm 23 between which and a controlling lever 24 a cable 25 is interposed as shown. The said lever 24 is located closely adjacent to the seat of the operator on the machine, and it is equipped with a detent 26, designed for coöperation with a segmental rack 27, fixed with respect to the machine. In addition to the elements named, the locking means includes a vertically disposed pin 28 that extends through the housing 20 and is provided with a lower taper portion 29, a flange 30, and an upper toothed portion 31, the latter intermeshed with the before-mentioned gear 22; and the mechanism also comprises a coiled spring 32 that is disposed in the housing 20 and is interposed between the upper end thereof and the flange 30, and hence has a tendency to force the pin downwardly. The lower end of the said pin 28 is movable in the arcuate groove 10 of the member 3 and is adapted to seat in the central downwardly tapered aperture or bore 11 of said member.

It will be apparent from the foregoing that my improvement constitutes a positive reversing and quick turning steering mechanism, and one through the medium of which a harvester, mower or binder not only may be expeditiously turned, but may be reversed, for it will be seen that when the member 3 is swung about its center through the medium of the steering pole 5, the steering wheel 15 will be turned much faster than the pole 5, with the result that the machine will be turned at a higher rate of speed than the pole 5. Moreover when it is necessary to reverse or move the machine rearwardly, the machine is first alined with the steering pole 5, and when the parts are so arranged, the pin 28 is seated in the aperture or bore 11 of the member 3, whereupon my improvement will provide for the straight rearward movement of the machine. Then after the machine has been moved rearwardly it is simply necessary for the operator to raise the pin 28, whereupon turning of the machine in any direction will be permitted.

I have entered into a detailed description of the construction and relative arrangement of the parts embraced in my improvement, in order to impart a full, clear and exact understanding of the best practical embodiment of my invention of which I am cognizant. I desire it clearly understood, however, that I do not limit myself to the exact shape or details shown and described, alterations and changes therein being possible without in any way departing from the essence of the invention and as may reasonably be construed as falling within the ambit of the claims appended.

Having described my invention, what I claim and desire to secure by Letters-Patent, is:

In a steering mechanism, the combination of a wheeled frame, a horizontally disposed swinging member pivotally connected to the said frame and having an internal arcuate rack on one of its walls and an arcuate slot in its bottom wall, a steering pole connected to and movable with the said swinging member, a spur gear intermeshed with the arcuate rack of the said swinging member and disposed in the member, and a steering wheel connected and movable with the said spur gear, said connection extending loosely through said arcuate slot, the swinging member further having an arcuate groove in the upper side of the rack bearing wall and a central vertical bore in said wall and in communication with said groove, a vertical spring-pressed pin carried by the frame and arranged for coöperation with said groove and vertical bore, and means on the frame and connected with said pin to retract the pin and to hold the same in retracted position.

In testimony whereof I affix my signature.

JOHN J. FRAWLEY.